United States Patent
Smirnov

(10) Patent No.: US 8,915,262 B2
(45) Date of Patent: Dec. 23, 2014

(54) MASS FLOW CONTROLLER ALGORITHM WITH ADAPTIVE VALVE START POSITION

(75) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 677 days.

(21) Appl. No.: 13/206,022

(22) Filed: Aug. 9, 2011

(65) Prior Publication Data
US 2013/0037112 A1 Feb. 14, 2013

(51) Int. Cl.
G05D 7/06 (2006.01)
G05B 13/02 (2006.01)

(52) U.S. Cl.
CPC .......... *G05B 13/021* (2013.01); *G05D 7/0635* (2013.01)
USPC .......... 137/486; 137/487.5; 700/282; 702/45

(58) Field of Classification Search
CPC .................................................. G05D 7/0635
USPC .................. 137/486, 487.5; 700/282; 702/45
See application file for complete search history.

(56) References Cited

U.S. PATENT DOCUMENTS

| | | | |
|---|---|---|---|
| 5,062,446 A | | 11/1991 | Anderson |
| 5,865,205 A | * | 2/1999 | Wilmer ............................. 137/2 |
| 2008/0140260 A1 | * | 6/2008 | Ding ............................. 700/282 |
| 2010/0000608 A1 | * | 1/2010 | Goto et al. ........................ 137/2 |
| 2010/0036534 A1 | | 2/2010 | Ding |

OTHER PUBLICATIONS

Lindner, Nora, "International Preliminary Report on Patentability re Application No. PCT/US2012/049323", Feb. 20, 2014, p. 7 Published in: CH.
Mitrovic, B., "International Search Report and the Written Opinion re Application No. PCT/US2012/049323", Apr. 9, 2012, Published in: AU.

* cited by examiner

*Primary Examiner* — William McCalister
(74) *Attorney, Agent, or Firm* — Neugeboren O'Dowd PC

(57) ABSTRACT

A mass flow controller (MFC), a method for calibrating an MFC, and a method for operating an MFC are disclosed. The MFC may include a valve that is adjustable between a closed position and an open position to control a flow rate of a fluid responsive to a control signal, a thermal mass flow sensor that provides an indication of the flow rate of the fluid, calibration data including data that relates the control signal to the flow rate of the fluid at a plurality of fluid flow rates, and a control system that provides, based upon the calibration data and run time data, an adjustable non-zero starting control signal to the valve when the valve is closed to more quickly respond to a set point signal.

10 Claims, 12 Drawing Sheets

CALIBRATION DATA

| Pressure 1 | | |
|---|---|---|
| | Control Signal | Flow |
| | CS_Value_1 | F_value_1 |
| | CS_Value_2 | F_value_2 |
| | ⋮ | |
| | CS_Value_N | F_value_N |

| Pressure 2 | | |
|---|---|---|
| | Control Signal | Flow |
| | CS_Value_1 | F_value_1 |
| | CS_Value_2 | F_value_2 |
| | ⋮ | |
| | CS_Value_N | F_value_N |

| Pressure N | | |
|---|---|---|
| | Control Signal | Flow |
| | CS_Value_1 | F_value_1 |
| | CS_Value_2 | F_value_2 |
| | ⋮ | |
| | CS_Value_N | F_value_N |

FIG. 5

MASS FLOW CONTROLLER ALGORITHM WITH ADAPTIVE VALVE START POSITION

FIELD OF THE INVENTION

The present invention relates generally to mass flow controllers. In particular, but not by way of limitation, the present invention relates to methods and systems for controlling a mass flow controller.

BACKGROUND OF THE INVENTION

A typical mass flow controller (MFC) is a closed-loop device that sets, measures, and controls the flow of a gas in industrial processes such as thermal and dry etching among other processes. An important part of a MFC is a sensor that measures the mass flow rate of the gas flowing through the device. Typically, a closed-loop control system of the MFC compares an output signal from the sensor with a predetermined set point and adjusts a control valve to maintain the mass flow rate of the gas at the predetermined set point.

The closed-loop system performs well when valve is relatively close to required position and its movement changes the flow, so that the algorithm immediately sees flow response and adjusts valve position accordingly. When a MFC is at zero set point (zero valve position), and then is given non-zero set point, it takes a long time for valve to move from zero position to a position where noticeable flow appears and closed-loop algorithm starts working properly. This results in long response delay and poor performance of the MFC. And to date, attempts to improve a response time of the MFC have been unsuccessful or are otherwise unsatisfactory.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

An aspect of the invention may be characterized as a mass flow controller comprising a valve that is adjustable between a closed position and an open position to control a flow rate of a fluid responsive to a control signal, a thermal mass flow sensor that provides an indication of the flow rate of the fluid, calibration data including data that relates the control signal to the flow rate of the fluid at a plurality of fluid flow rates, and a control system that provides, based upon the calibration data and run time data, an adjustable non-zero starting control signal to the valve, when the valve is closed, to more quickly respond to the set point signal.

Another aspect of the invention may be characterized as a method for operating a mass flow controller. The method may include receiving, when the valve is closed, a set point signal corresponding to a desired flow rate and calibration data stored on the mass flow controller to obtain a value of a calibrated non-zero starting control signal and to obtain a value of a calibrated control signal at a particular flow rate. In addition, an adjustable non-zero starting control signal is applied at the value to a valve of the mass flow controller and during operation, and before the set point signal decreases, a measured value of the control signal at the particular flow rate is obtained. The measured value of the control signal is compared with a level of a calibrated control signal at the particular flow rate that is stored on the mass flow controller, and based upon the comparison, the value of the adjustable non-zero starting control signal is adjusted to an adjusted value so that a next time the mass flow controller receives, when the valve is closed, another set point signal, the adjusted value is used.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

FIG. 5 depicts exemplary calibration data;

DETAILED DESCRIPTION

Figure 1:
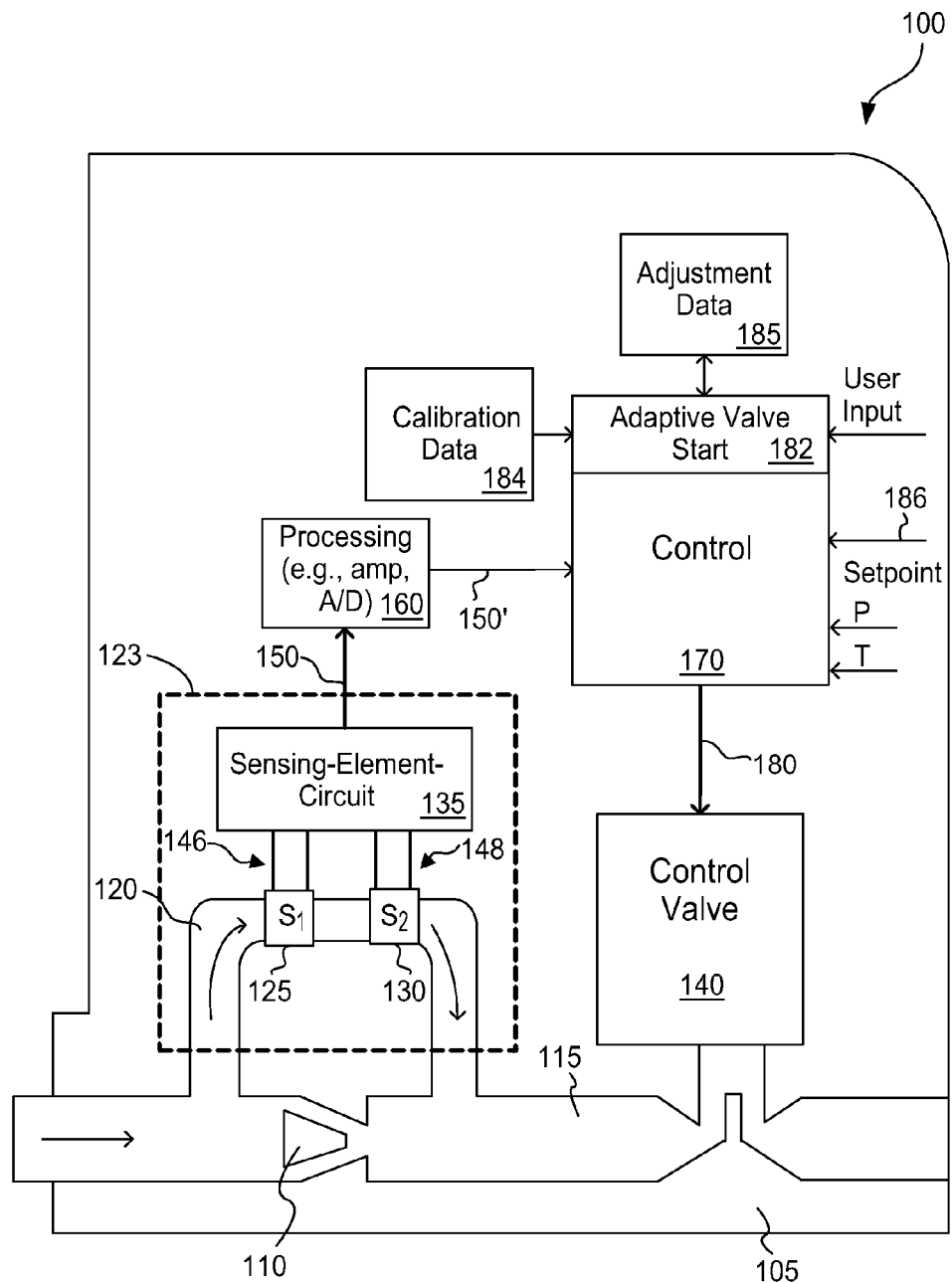
FIG. 1 is a functional block diagram of a mass flow controller in accordance with an illustrative embodiment of the invention.

Referring now to the drawings, where like or similar elements are designated with identical reference numerals throughout the several views where appropriate, and referring in particular to FIG. 1, it is a functional block diagram of an MFC 100 in accordance with an illustrative embodiment of the invention. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, firmware, software, or any combination thereof. Moreover, in light of this specification, the construction of each individual component is well within the skill of those of ordinary skill in the art.

As depicted, in the present embodiment a base 105 of MFC 100 includes bypass 110 through which a gas flows. Bypass 110 directs a constant proportion of gas through main path 115 and sensor tube 120. As a consequence, the flow rate of the fluid (e.g., gas or liquid) through the sensor tube 120 is indicative of the flow rate of the fluid flowing through the main path of the MFC 100.

In this embodiment, the sensor tube 120 is a small bore tube that is part of a thermal mass flow sensor 123 of the MFC 100.

And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 146, 148 from the sensing elements 125, 130) to provide an output signal 150, which is indicative of the flow rate through the sensor tube 120, and hence, indicative of the flow rate through the main path 115 of the MFC 100.

As shown in FIG. 1, the output signal 150 may be processed by processing portion 160 to generate a processed-representation 150' of the output signal 150. For example, the processed-representation 150' may be a digital representation of the output signal 150. More specifically, the processing portion 160 may amplify and convert, using an analog to digital converter, the output signals 150 to a digital representation of the output signal 150.

As one of ordinary skill in the art will readily recognize, the processing portion 160 may also adjust the output signal 150 (e.g., by adjusting the signal 150 with predetermined calibration coefficients) based upon physical characteristics of the MFC 100 and/or characteristics of the fluid (e.g., gas) flowing through the MFC 100.

The control component 170 in this embodiment is generally configured to generate a control signal 180 to control a position of the control valve 140 based upon the output signal 150. The control valve 140 may be realized by a piezo valve or solenoid valve, and the control signal 180 may be a voltage (in the case of a piezo valve) or current (in the case of a solenoid valve). And as one of ordinary skill in the art will appreciate, the MFC 100 may include pressure and temperature sensors that provide pressure (P) and temperature (T) inputs to the control component 170. And as shown, the control component 170 in this embodiment includes an adaptive valve start component 182 that is coupled to calibration data 184, a user input, and adjustment data 185. Collectively, the processing 160, control component 170 (including the adaptive valve start component 182), and the control signal 180 generated by the control component 170 are part of a control system that provides, based upon the calibration data and run time data, an adjustable non-zero starting control signal to the valve 140 when the valve 140 is closed to more quickly respond to the set point signal 186. The control component 170 may be realized by software, nonvolatile memory, hardware and/or firmware or combinations thereof, and it may include non-transitory processor readable instructions that effectuate the methods described further herein.

In general, the adaptive valve start component 182 operates to provide an adjustable non-zero starting control signal 180 to the control valve 140, based upon the calibration data 184 and runtime data of the MFC 100, when the control valve 140 is closed, to more quickly respond to a set point signal 186. In addition, the user input to the adaptive valve start component 182 enables a user to alter the adjustable non-zero starting control signal 180 to adjust a response of the MFC 100 as discussed further with reference to FIG. 7. And the adaptive valve start component 182 generates the adjustment data 185, and uses the adjustment data 185 to adjust the adjustable non-zero starting control signal 180 to compensate for the effects of temperature drift, aging, and other factors that affect the response of the MFC 100. Thus, the adaptive valve start component 182 may be used to establish a desired transient response (e.g., based upon user input) by setting a value of the adjustable non-zero starting control signal 180, and then the adaptive valve start component 182 adjusts the adjustable non-zero starting control signal 180 to maintain the desired transient response when the environment and/or age affects the transient response.

In prior implementations, the closed-loop control loop of mass flow controllers performed relatively well when the valve is relatively close to a required position and its movement changes the flow, so that the control loop sees flow response and immediately adjusts the valve position accordingly. But in these prior systems, when the MFC was set to a zero position (zero valve position), and the MFC was given a non-zero set point, it would take a long time for the valve to move from a zero position to a position where a noticeable flow would appear and the closed-loop control loop would start working properly. As a consequence, there was a long response delay and generally poor MFC performance.

Figure 2:
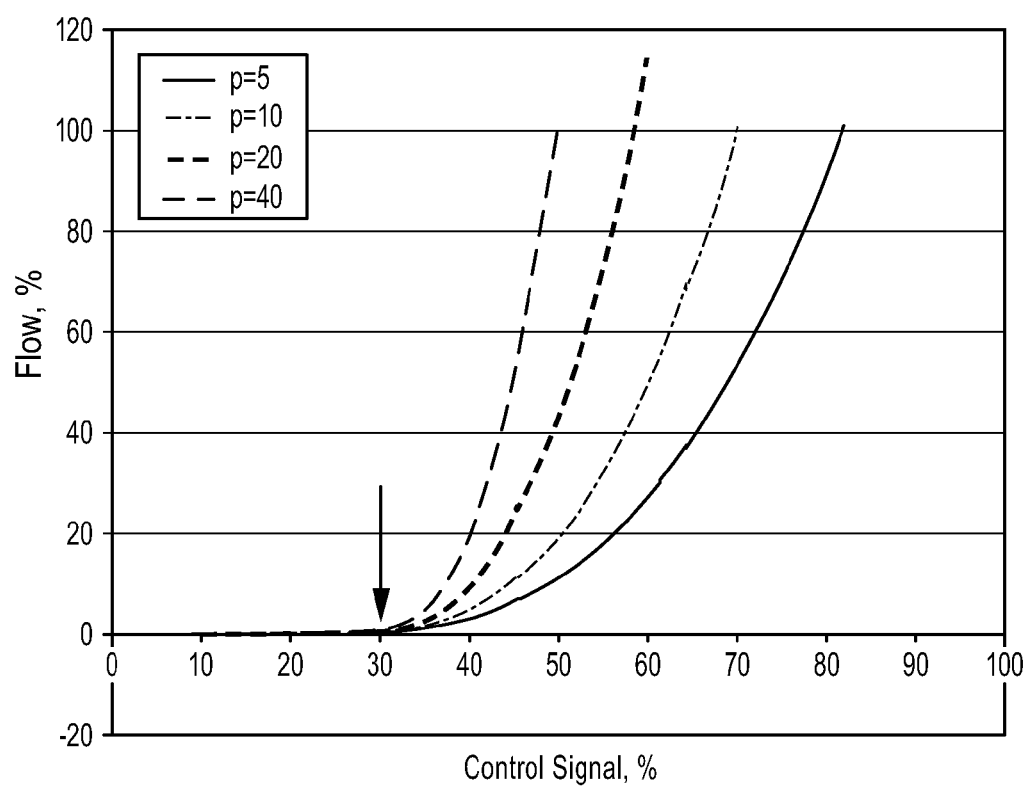
FIG. 2 is a graph depicting flow values versus control signal values for a mass flow controller.

Thus, to remove the response delays and poor performance, the adaptive valve start component 182 improves the performance of the MFC 100 by immediately moving the control signal 180 from a zero value (e.g., zero current or voltage) to an adjustable non-zero starting control signal value while the control valve 140 is closed. Referring briefly to FIG. 2, for example, depicted are flow values (in terms of percent of maximum flow) versus control signal values (in terms of percent of maximum control signal value) for a particular MFC 100 at four different pressure levels. As shown, the control signal 180 that is applied to the control valve 140 could be moved to 30% immediately because that is the point where mass flow begins to occur through the control valve 140.

In many variations of the embodiment depicted in FIG. 1, the calibration data 184 is calculated in advance (e.g., during manufacture) with a calibration gas (e.g., nitrogen) at room temperature before the MFC 100 is deployed for use. Although calibration could be carried out in advance of use, consistent with many embodiment of the invention, with several different gasses at several different temperatures, that type of process for calibration would be very lengthy and it is unnecessary in light of the ability to adjust for variations in the response of the MFC 100 (e.g., due to temperature, aging, etc.) discussed further herein.

Figure 3:
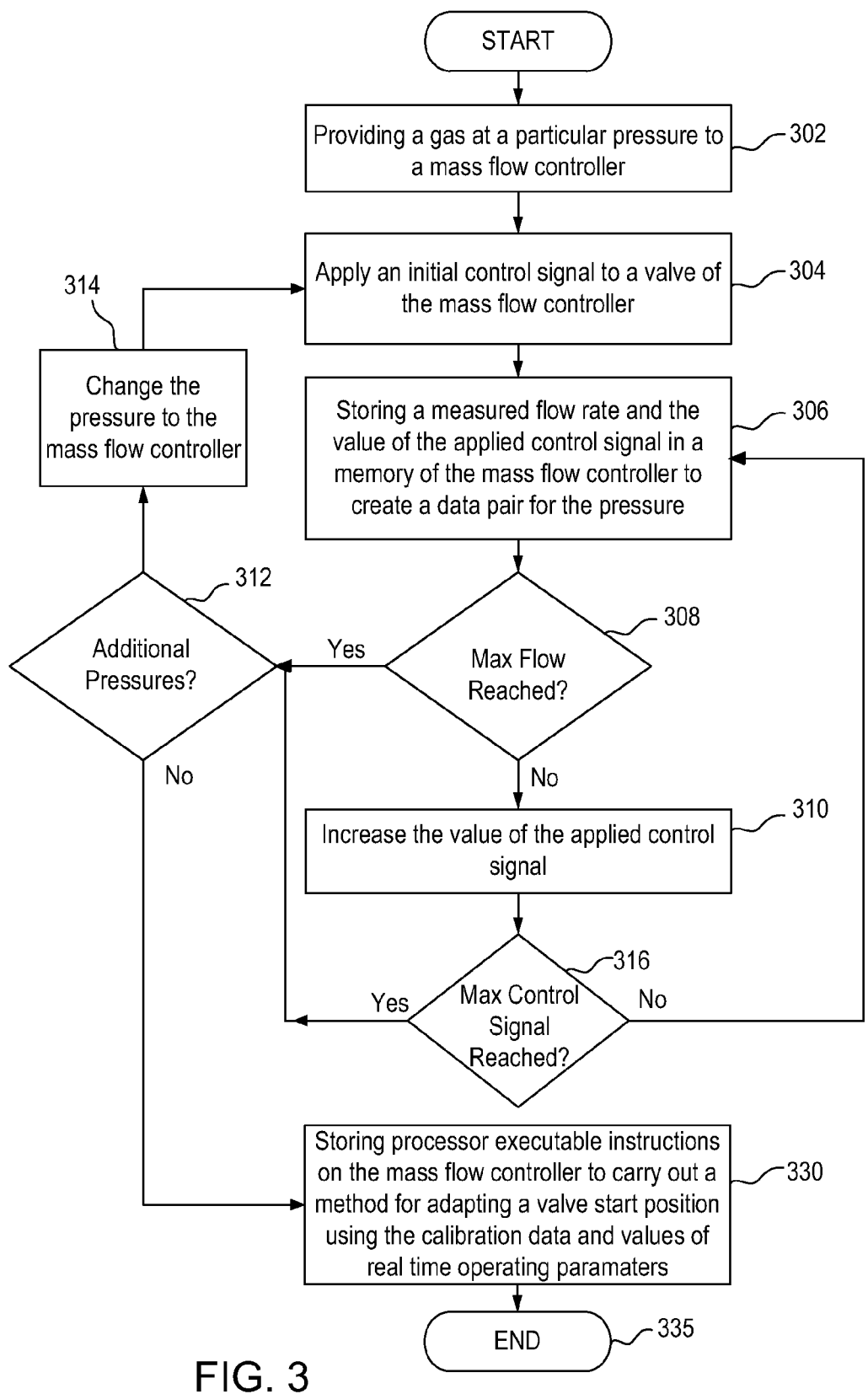
FIG. 3 is a flowchart depicting an exemplary calibration process that may be used with the mass flow controller of FIG. 1.

Referring next to FIG. 3, it is a flowchart depicting an exemplary calibration process that may be used to create the calibration data 184 depicted in FIG. 1. Although the calibration process depicted in FIG. 3 includes calibration of the MFC 100 at two or more pressures, many aspects of the present invention are viably operable if the calibration process depicted in FIG. 3 is carried out at only one pressure. In addition, in the calibration process depicted in FIG. 3, the control signal 180 is iteratively adjusted and corresponding measured flow values are stored to generate the calibration data 184, but one of ordinary skill in view of this specification will appreciate that flow values may be iteratively adjusted and corresponding control signal 180 values may be obtained and stored to generate the calibration data 184.

As shown, in the process depicted in FIG. 3, a gas is provided at a particular pressure to the MFC 100 (Block 302), and the control signal 180 is applied at an initial value that prompts detectable flow through the control valve 140 of the MFC 100 (Block 304). For example, the control signal 180 may be slowly adjusted from a zero value until flow is first detected through the control valve 140, and once flow is detected, the corresponding control signal 180 is the initial non-zero starting control signal that is stored in the calibration process. As shown, a measured flow rate and the value of the applied control signal are stored in a memory of the MFC 100 to create a data pair for the particular pressure (Block 306).

Once the initial non-zero starting control signal value is stored, additional increasing values of the control signal 180 are applied (Block 310), and for each of the control signal values, the measured flow rate is stored (in connection with the corresponding control signal value) to create data pairs for the particular pressure (Block 306). For example, once flow is first detected to obtain a starting control signal value, the control signal may be increased in a stepwise manner (e.g., by a step size of 1% of the maximum control signal level) until the maximum flow or maximum control signal level is reached.

Figure 4:
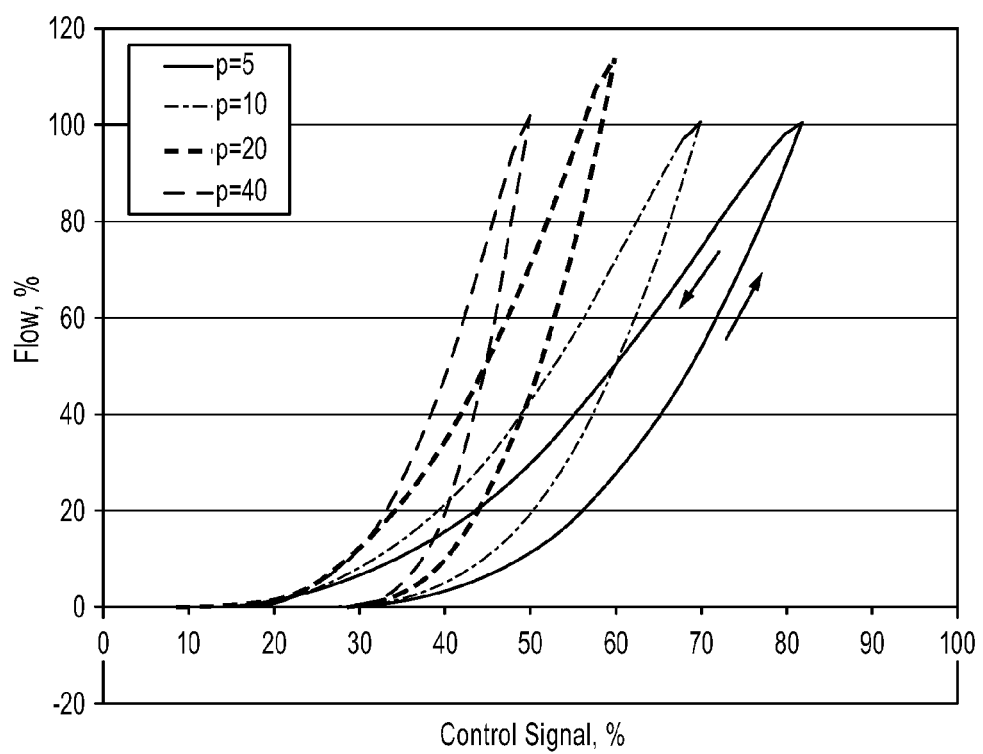
FIG. 4 is a graph depicting operating characteristics of flow versus control signal for a mass flow controller.

It is noted that an actuator associated with the MFC 100 experiences hysteresis (e.g., piezoelectric or solenoid hysteresis) so that control signal values on a curve of ascending flow values differ from the control signal values for the same flow values on a curve of descending flow values. Referring to FIG. 4, for example, shown for each of four pressure levels are an ascending curve and a descending curve. As shown, for many, if not most, of the control signal values on an ascending curve, the control signal values on a corresponding descending curve differ substantially. Because the control valve 140 during runtime operation starts from an initial, zero (closed) position and moves to an open position along an ascending curve, the calibration data that is captured, as depicted in FIG. 3 (and in many variations of the process depicted in FIG. 3), is taken along an ascending curve.

Referring again to FIG. 3, if the maximum flow is reached for the particular pressure (Block 308), or the maximum control signal is reached for the particular pressure (Block 316), and there are additional pressures to capture data for (Block 312), then the pressure to the mass flow controller is changed to another pressure level (Block 314), and another initial non-zero starting control signal (where flow is first detected) is applied to the control valve 140 (Block 304). And then increasing control signal values are applied and stored in memory in connection with the corresponding flow rates to form the calibration data 184 (Blocks 306 to 310). As a consequence, after the process depicted in FIG. 3 is carried out, the calibration data 184 includes, for each of a plurality of pressure levels, a non-zero starting control signal value (where flow is first detectible) and additional data pairs that each include a control signal value and corresponding flow value.

Referring for example to FIG. 5, shown is exemplary adaptive valve start calibration data for N pressure levels. As shown, for each pressure level, there are a set of data pairs, and each of the sets of data pairs includes a plurality of control signal values and one corresponding flow rate value for each of the plurality of control signal values obtained while the flow rate is increasing. In addition, processor executable instructions are stored on the MFC 100 to carry out a method (described in more detail with reference to FIG. 6) for adapting a valve start position (also referred to herein as the adjustable non-zero starting control signal value) using the calibration data 184 and values of real time operating parameters (Block 330). The adaptive valve start component 182 may include these processor executable instructions and the associated hardware for executing them.

Figure 6:
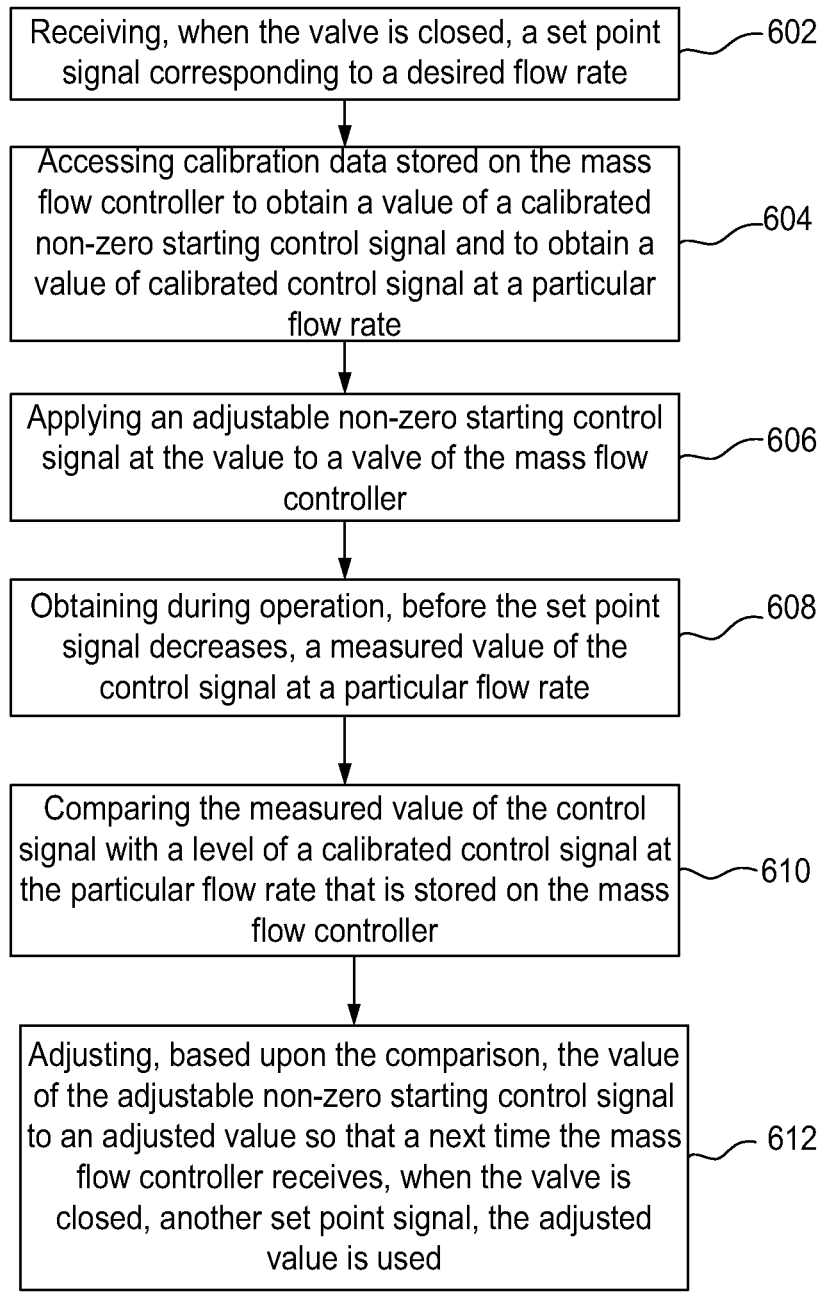
FIG. 6 is a flowchart that depicts a process that may be traversed by the mass flow controller in FIG. 1 during runtime.

Referring next to FIG. 6, shown is a flowchart that depicts a process that may be traversed by the MFC 100 during runtime. Although reference is made to the MFC 100 described with reference to FIG. 1, it should be recognized that the process depicted in FIG. 6 is not limited to the specific, exemplary embodiment in FIG. 1. As depicted, in operation, when the control valve 140 is closed, the set point signal 186 is received that has a value corresponding to a desired flow rate (Block 602). In the context of plasma processing (e.g., thin film deposition), the flow rate may be the desired flow rate for a specific gas that is needed as part of the plasma process.

As shown, the calibration data 184 is accessed to obtain a value of a calibrated non-zero starting control signal and a value of a calibrated control signal at a particular flow rate, and these values are used later to adjust the adjustable non-zero starting control signal (Block 604). The control signal 180 is then applied as an adjustable non-zero starting control signal at an initial value to the control valve 140 (Block 606). As a consequence, the closed-loop control system of the MFC 100 is engaged substantially sooner (when the flow is about to start or has just started) as opposed to prior approaches where the starting control signal value is zero and the control loop is not engaged until after a delay during which the control signal slowly reaches a level (using the control loop) where the flow begins.

When the MFC 100 is first deployed for use (e.g., when a user receives the MFC 100 from a supplier), the calibrated non-zero starting control signal may be used as the initial value of the adjustable non-zero starting control signal, but once the MFC 100 is in use, the adjustable non-zero starting control signal is based upon the calibration data and run time data.

For example, in embodiments where the calibration data 184 includes calibration data for a plurality of pressures, the control signal 180 is applied at Block 606 as an adjustable non-zero starting control signal at a value that is obtained by adding difference data (stored in the adjustment data 185) to the calibrated non-zero starting control signal. The difference data in these embodiments is based upon differences between the calibration data 184 and run time measurements that were previously obtained during one or more previous process runs. Additional information detailing an exemplary approach for generating the difference data is provided below with reference to Blocks 610 and 612 below.

And in the embodiments where the calibration data 184 includes calibration data for only a single pressure, the adjustment data 185 includes the value of the adjustable non-zero starting control signal, and the control signal 180 is applied at Block 606 as an adjustable non-zero starting control signal at the value obtained from the adjustment data 185. As discussed below with reference to Blocks 610 and 612, the stored value of the adjustable non-zero starting control signal may be adjusted during each run and updated in the adjustment data 185.

Regardless of whether the calibration data 184 is based upon a single pressure or multiple pressures, the value of the calibrated control signal (at a particular flow rate) that is obtained in Block 604 is utilized, as discussed further below, to adjust the adjustable non-zero starting control signal during a subsequent run. Although two pieces of data are obtained in Block 604, it should be recognized that these two pieces of data need not be obtained co-currently.

In the implementations where the calibration data 184 includes calibration data for each of a plurality of pressure levels (e.g., as depicted in FIG. 5), a pressure transducer in the MFC 100 may be used to obtain a signal that is indicative of a pressure of the fluid, and the calibration data 184 may be accessed to select a value of a calibrated non-zero starting control signal that is based upon the measured pressure.

But having calibration data for a plurality of pressures is not required in connection with the method depicted in FIG. 6, at least, because the method in FIG. 6 contemplates that valve/flow characteristics are not constant and may change and as a consequence, the adjustable non-zero starting control signal is adjusted to account for variances in operating conditions that affect valve/flow characteristics.

Although applying an adjustable non-zero starting control signal to the MFC 100 when the control valve 140 is closed will generally improve a response of the MFC 100, it is contemplated that users of the MFC 100 will desire a particular transient response depending upon the particular processing application in which the MFC 100 is used. As a consequence, in many embodiments the adaptive valve start component 182 enables a user to define (by way of the user input) a desired transient response of the MFC 100 by adding or subtracting an offset from the adjustable non-zero starting control signal.

Figure 7A:
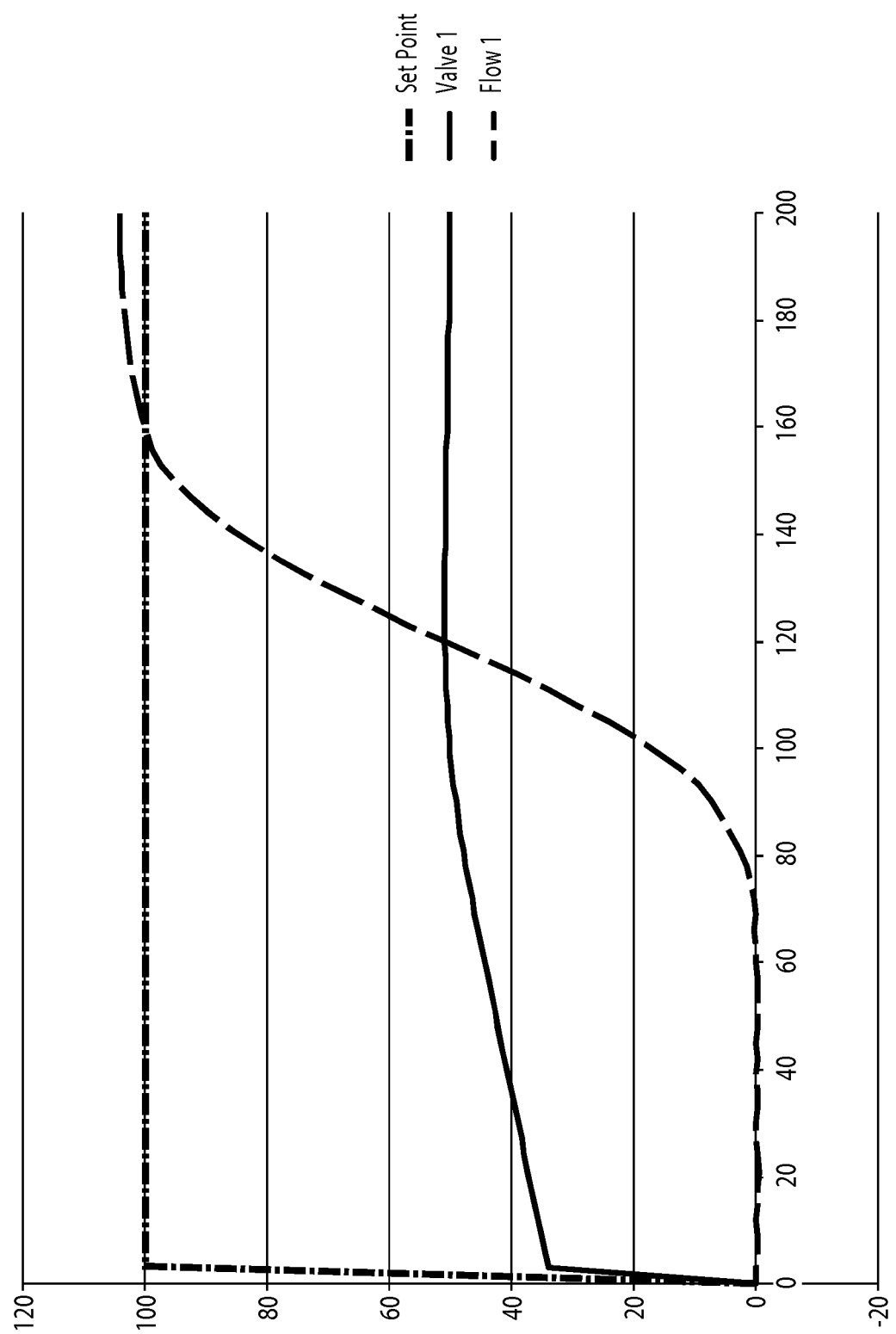
FIGS. 7A-7C are graphs depicting transient flow conditions for different starting control signals.
Figure 7B:
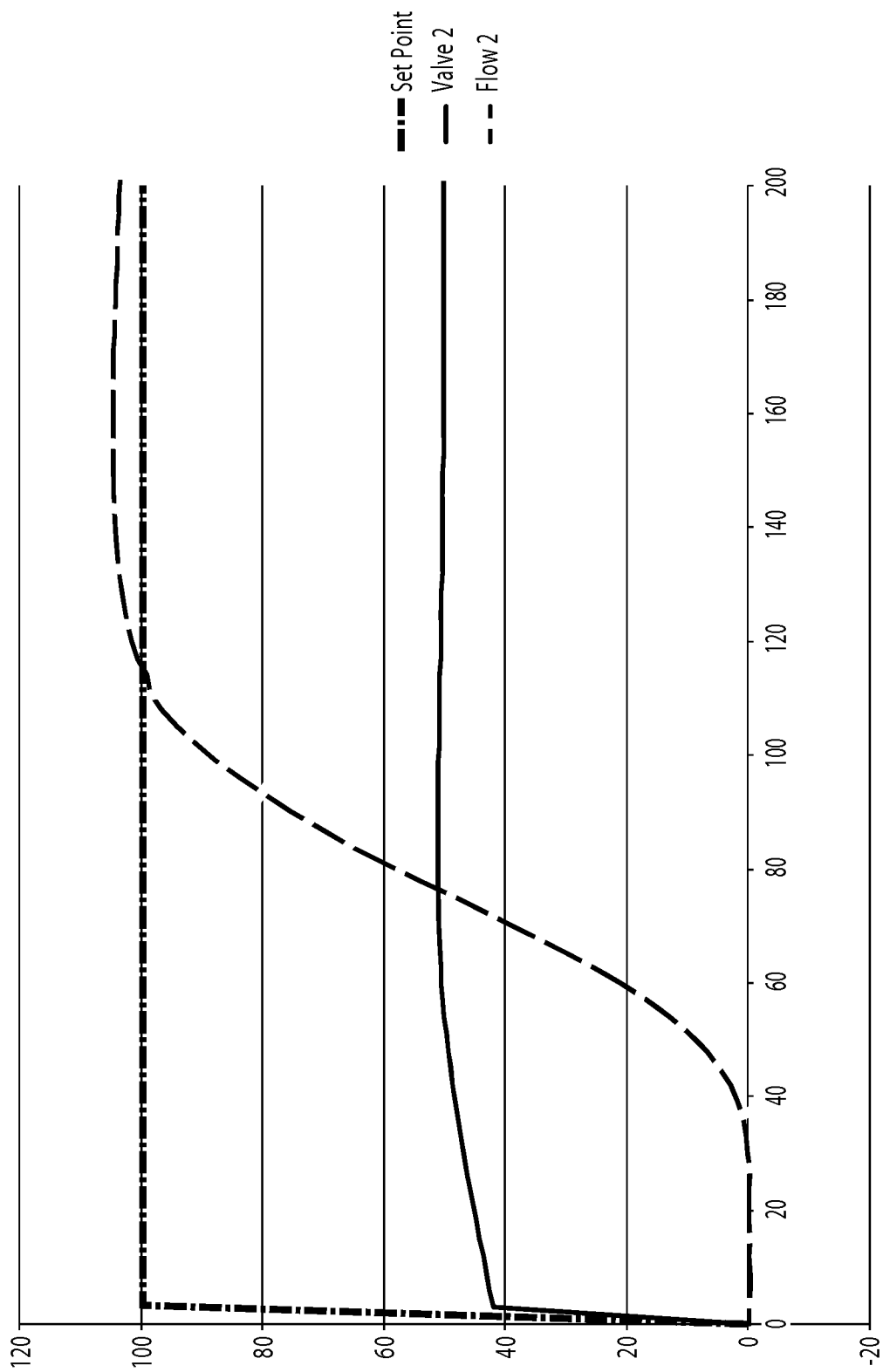
Figure 7C:
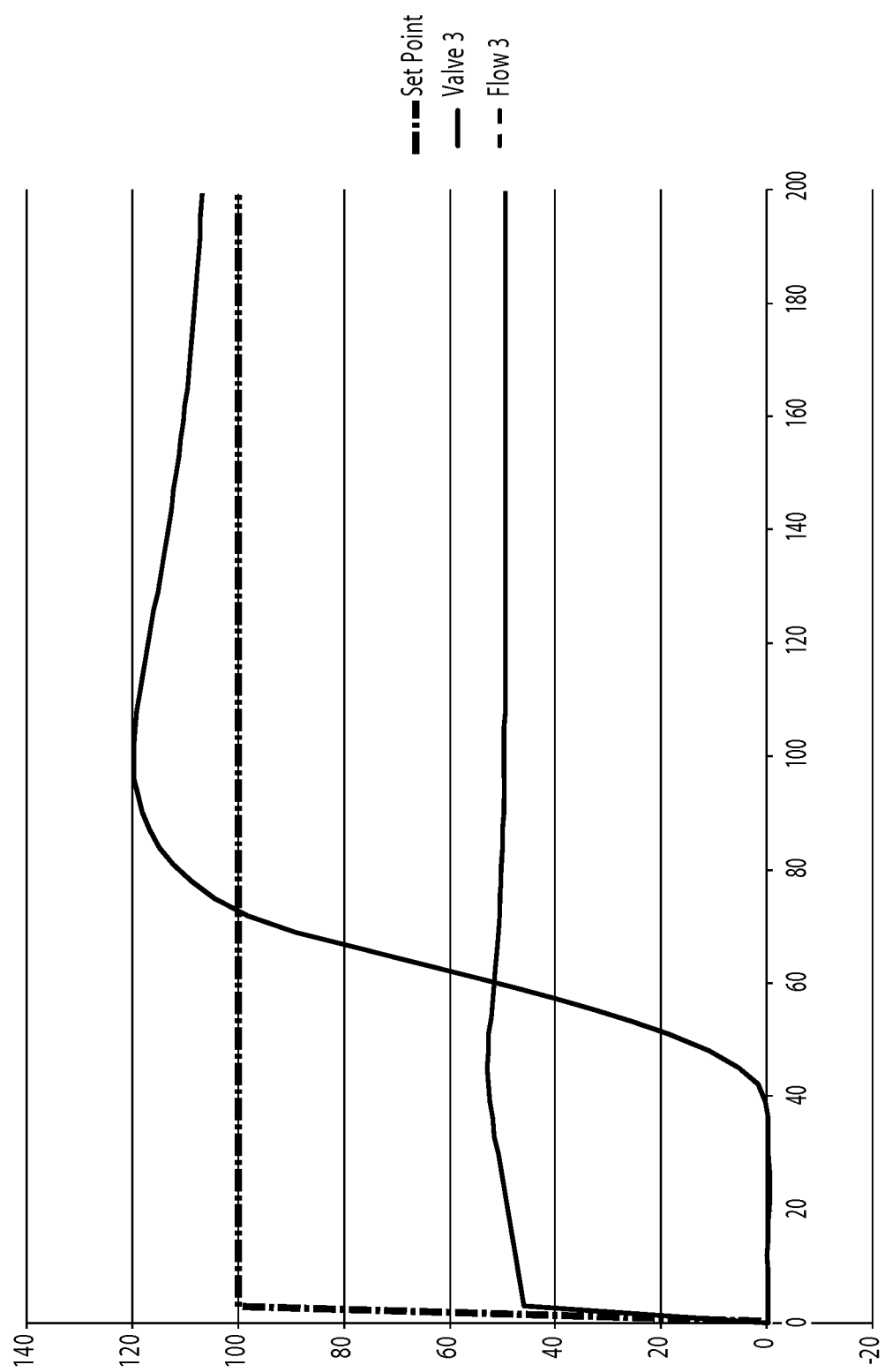

Referring to FIGS. 7A-7C, for example, shown are graphs that depict transient flow conditions relative to three corresponding starting control signals. In FIG. 7A for example, shown is a starting control signal that has a value that produces a response that is slower than the starting control signals in FIGS. 7B and 7C. In some applications, the slower response in FIG. 7A may be desirable, but in other applications the response may be less than optimal as compared to the starting control signal depicted in FIGS. 7B and 7C, which produce faster response times. As a consequence, if the initial non-zero starting control signal obtained from the calibration data 184 produces the response depicted in FIG. 7A, a positive offset may be added to the non-zero starting control signal to produce the transient response in FIG. 7B or a larger offset may be added to the non-zero starting control signal to produce the transient response in FIG. 7C.

Similarly, if the non-zero starting control signal provides the response shown in FIG. 7C, which results in a transient overshoot that may not be acceptable during runtime processing, the user may add a negative offset to non-zero starting control signal to produce the response in FIG. 7B, or the user may add a larger negative offset to the non-zero starting control signal to produce the slower response in FIG. 7A.

Although the adjustable non-zero starting control signal generally improves response, and may be configured to arrive at a desired transient response, environmental (e.g., temperature) and other factors (e.g., age of the MFC 100) affect the relationship between the transient response and the starting control signal. In other words, if a desired transient response is achieved (e.g., by adjustment with an offset that is applied to the starting control signal), temperature and age will cause the MFC 100 to have a different response with the same starting control signal.

Figure 8:
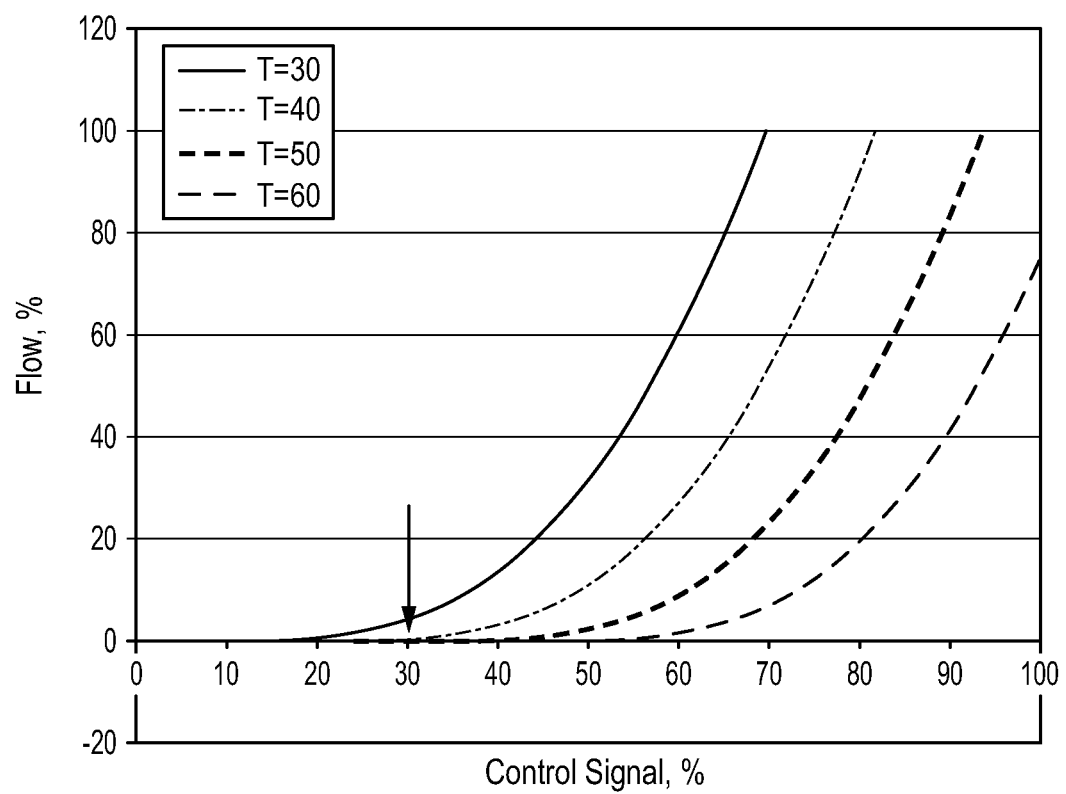
FIG. 8 is a graph depicting valve-flow characteristics of a mass flow controller.

Referring to FIG. 8, for example, shown are flow-versus-control-signal curves for four different temperatures. If a calibrated valve start of 30% were used and the valve/flow characteristic drifts with temperature as shown in FIG. 8, the MFC 100 may produce overshoot at 30 degrees Celsius or a long response delay at 60 degrees Celsius if the process gas temperature during run time is different than the calibration temperature. In addition, there may also be long-term drift of valve/flow characteristics due to aging of valve materials, which also results in performance degradation.

Figure 9:
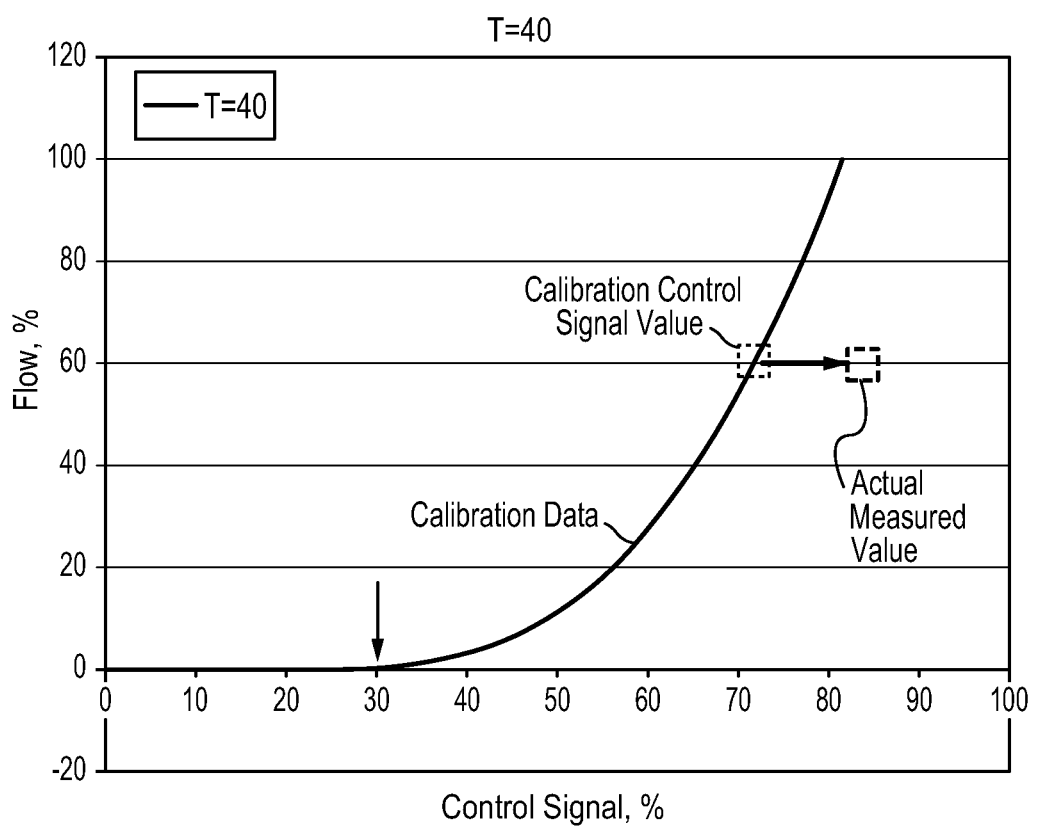
FIG. 9 is a graph depicting valve-flow characteristics during calibration.

Most of the time, a temperature and/or aging-related change of valve-flow characteristics is practically a "parallel shift," that may characterized by a curve that shifts left or right along a "control signal" axis while its shape stays substantially the same. Referring to FIG. 9 for example, shown is a calibrated control-signal-versus-flow curve obtained at 40 degrees Celsius that may be represented as data pairs in the calibration data 184. As shown, this exemplary collection of calibration data indicates that an optimal starting control signal 180 is 30% (of the maximum control signal level), and when the control signal 180 is at a value of 70% the flow rate is 60% (of the maximum flow level). When the MFC 100 is in use, however, the operating characteristics of the MFC 100 and/or the environment in which the MFC 100 is placed in may alter the characteristics of the MFC 100 so that to achieve the same particular 60% flow rate, the measured control signal value needs to be 85% (of the maximum control signal level). Assuming the 15% shift in the control signal value is part of an overall "parallel" shift of the entire control-signal-versus-flow curve, then a similar shift from 30% to 45% can be expected for the starting control signal.

As a consequence, as part of the adjustment to the adjustable non-zero starting control signal, during operation, before the set point signal 186 decreases, a measured value of the control signal is obtained at the particular flow rate (Block 608). The particular flow rate at which the measured flow rate is obtained is the same particular flow rate (discussed with reference to block 604) that was used in connection with obtaining the value of the calibrated control signal from the calibration data 184 in block 604 above. And the measured value is obtained before the set point 186 decreases so that the measured value is taken from an ascending control-signal-versus-flow curve (just as the calibrated control signal at the particular flow rate was obtained during calibration).

Figure 10:
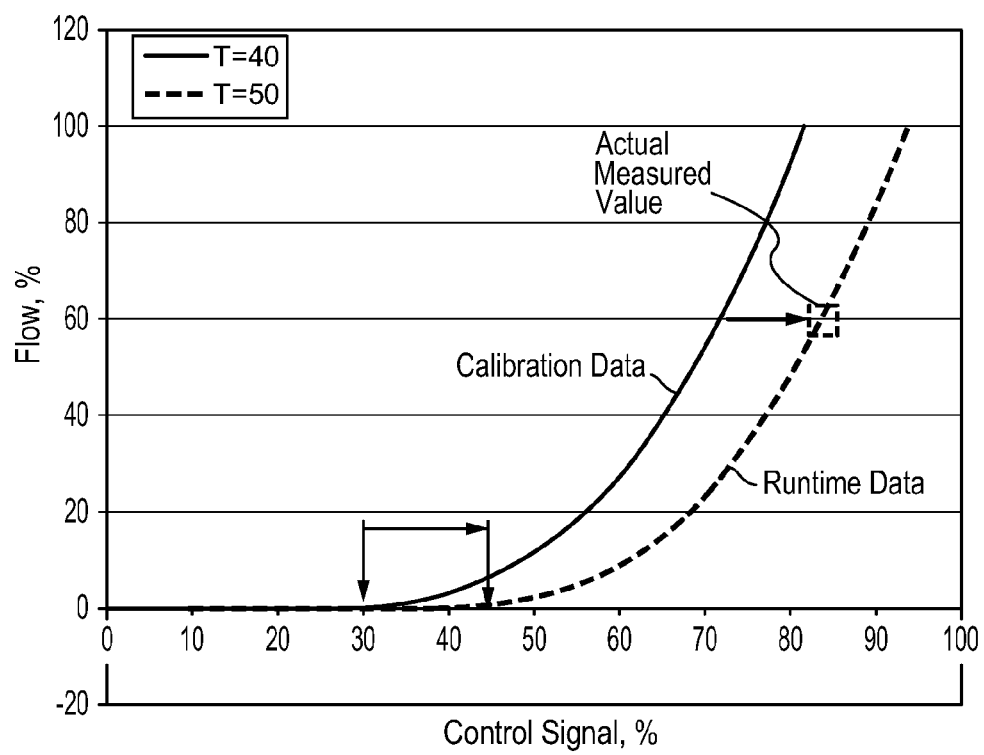
FIG. 10 is a graph depicting valve-flow characteristics during calibration and during runtime.

Referring to FIG. 10 simultaneously with FIG. 6 for example, shown are two control-signal-versus-flow curves for the same MFC 100 at different temperatures. More specifically, the same control-signal-versus-flow calibration curve depicted in FIG. 8 that was obtained at 40 degrees Celsius is shown, and in addition, another control-signal-versus-flow curve that depicts actual operating characteristics during run time for the MFC 100 at 50 degrees Celsius is depicted. If the set point 186 is 60% flow for example, the measured value of the control signal may be taken at 60% flow on the ascending curve, which is 85%.

As shown in FIG. 6, the measured value of the control signal (85% in the example depicted in FIG. 9) is compared with a level of a calibration control signal (70% in the example depicted in FIG. 9) at the particular flow rate (e.g., 60%) that is stored on the mass flow controller (Block 610). And based upon the comparison, the value of the adjustable non-zero starting control signal is adjusted to an adjusted value so that a next time the mass flow controller receives, when the valve is closed, another set point signal, the adjusted value is used (Block 612).

In many embodiments, the value of the adjustable non-zero starting control signal is adjusted based upon the following algorithm: ASCS=CSCS+MVCS−CVCS where ASCS is the adjustable non-zero starting control signal that is adjusted to maintain a desired response; CSCS is the calibrated starting control signal, which is the value of the starting control signal taken from the calibration data; MVCS is the measured value of the control signal that is measured at a particular flow level; and CVCS is the calibrated value of the control signal, which is the value of the calibrated control signal at the particular flow value.

With reference to FIG. 9 for example the CSCS is 30% and the particular flow value is 60% so that MVCS is 85% and CVCS is 70%. As a consequence, ASCS for the next run is 45%. It should be recognized that the particular flow value that is selected may be any flow value that exists in both the calibration curve and the run time curve.

In embodiments where the calibration data 184 includes calibration data for a plurality of pressures, the difference between the measured value of the control signal (MVCS) and the calibrated value of the control signal (CVCS) is stored in the adjustment data 185 so that during a subsequent run, the stored difference is added to the value of the calibrated non-zero starting control signal that is stored in the calibration data 184 (for the current pressure) to obtain the adjustable non-zero starting control signal (ASCS). And the method described above with reference to Blocks 608 to 612 is carried out again to adjust the difference data as needed for yet other subsequent process runs.

And in the embodiments where the calibration data 184 includes calibration data for only a single pressure, the adjustment data 185 includes the value of the adjustable non-zero starting control signal (ASCS), which is accessed during a subsequent process run (the same way the initial value of a calibrated non-zero starting control signal is accessed as described with reference to Block 604), and applied to the control valve 140 as the adjustable non-zero starting control signal as discussed above with reference to Block 606. And the method described above with reference to Blocks 608 to 612 is carried out again to adjust the adjustable non-zero starting control signal as needed.

In variations of the method depicted in FIG. 6, the adjustment of the adjustable non-zero control signal can be done slowly, using estimations from many runs, with some predefined adjustment limit per run, for example 1% of valve voltage. It can also be filtered (integrated), to avoid effects of noisy valve measurements, especially at low set points. In addition, it is contemplated that large jumps of the adjustable non-zero starting control signal could indicate problems with the device; thus an alarm/warning may be triggered in response to an adjustable non-zero starting control signal jump exceeding a threshold.

Although the method described with reference to FIG. 6 adjusts the adjustable non-zero starting control signal responsive to changes in temperature, to further improve the ability of the adaptive valve start component 182 to adjust the value of the control signal 180 when the control valve 140 is starting from a closed position, temperature data may be gathered and used during runtime to improve aspects of the process depicted in FIG. 6.

For example, when a new adjustable non-zero starting control signal value (or difference data) is stored in the adjustment data 185, a temperature value from a temperature sensor in the MFC 100 may also be stored so that temperature information is stored in connection with the starting control signal value or difference data. The stored temperature data (in connection with the control signal or difference data) can be used to predict the optimal adjustable non-zero starting control signal value for subsequent process runs instantaneously if the temperature of the gas has changed significantly between the process runs.

In conclusion, the present invention provides, among other things, a method and apparatus for providing a desired response in a mass flow controller by providing an adjustable non-zero starting control signal to a control valve of the MFC, and maintaining the desired response by adjusting the starting control signal when factors such as temperature and age affect the desired response. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A mass flow controller comprising:
a valve that is adjustable between a closed position and an open position to control a flow rate of a fluid responsive to a valve control signal;
a thermal mass flow sensor that provides an indication of the flow rate of the fluid;
a control system that provides the valve control signal based upon the indication of the flow rate of the fluid and a flow set point signal;
calibration data including data that relates the valve control signal to the flow rate of the fluid at a plurality of fluid flow rates; and
wherein the control system includes an adaptive valve start component that provides, based upon the calibration data and run time data, an adjustable non-zero starting valve control signal to the valve when the valve is closed to more quickly respond to the flow set point signal, and wherein the adaptive valve start component is configured to;
determine a difference between an actual valve control signal level at a particular flow rate during operation and a calibration control signal level at the particular flow rate; and
adjust the adjustable non-zero starting valve control signal based upon the difference between the actual valve control signal level and the calibration control signal level.

2. The mass flow controller of claim 1, including:
a pressure transducer that provides a pressure signal that indicates a pressure of the fluid;
wherein the calibration data includes, for each of a plurality of pressure levels, a set of data pairs, each of the sets of data pairs including a plurality of valve control signal values and one corresponding flow rate value for each of the plurality of valve control signal values obtained while the flow rate is increasing, the control system providing the adjustable non-zero starting valve control signal based upon a particular set of the data pairs that is selected based upon the pressure signal.

3. The mass flow controller of claim 1, including a temperature transducer that provides a temperature signal;
wherein the control system is configured to store adjustable non-zero starting valve control signal values along with temperature readings during operation, and based upon the stored adjustable non-zero starting valve control signal values and the stored temperature readings, the control system is configured to apply an estimated temperature-based adjustable non-zero starting valve control signal to improve the response of the control system in the event of a substantial change in temperature since a last adjustment of the adjustable non-zero starting valve control signal.

4. The mass flow controller of claim 1, wherein the actual valve control signal level at the particular flow rate is obtained during a process run before the set point signal decreases.

5. The mass flow controller of claim 1, wherein the adjustable non zero starting valve control signal is selected from the group consisting of a voltage signal, current signal, charge signal, pulse-width-modulated voltage signal, and pulse-width-modulated current signal.

6. A mass flow controller comprising:

a valve that is adjustable between a closed position and an open position to control a flow rate of a fluid responsive to a valve control signal;

a thermal mass flow sensor that provides an indication of the flow rate of the fluid;

calibration data including data that relates the valve control signal to the flow rate of the fluid at a plurality of fluid flow rates; and a control system including:
- a processor to control the valve responsive to a set point signal; and
- a non-transitory, tangible processor readable storage medium coupled to the processor, encoded with processor readable instructions for controlling the valve when executed by the processor, the instructions comprising instructions for:
  - providing the valve control signal based upon the indication of the flow rate of the fluid and a flow set point signal;
  - providing, based upon the calibration data and run time data, an adjustable non-zero starting valve control signal to the valve when the valve is closed to more quickly respond to the set point signal;
  - determining a difference between an actual valve control signal level at a particular flow rate during operation and a calibration control signal level at the particular flow rate; and
  - adjusting the adjustable non-zero starting valve control signal based upon the difference between the actual valve control signal level and the calibration control signal level.

7. The mass flow controller of claim 6, including:

a pressure transducer that provides a pressure signal that indicates a pressure of the fluid;

wherein the calibration data includes, for each of a plurality of pressure levels, a set of data pairs, each of the sets of data pairs including a plurality of valve control signal values and one corresponding flow rate value for each of the plurality of valve control signal values obtained while the flow rate is increasing, the non-transitory, tangible processor readable storage medium including instructions for providing the adjustable non-zero starting valve control signal based upon a particular set of the data pairs that is selected based upon the pressure signal.

8. The mass flow controller of claim 6, including a temperature transducer that provides a temperature signal;

wherein the non-transitory, tangible processor readable storage medium includes instructions for storing adjustable non-zero starting valve control signal values along with temperature readings during operation, and based upon the stored adjustable non-zero starting valve control signal values and the stored temperature readings, the instructions include instructions for applying an estimated temperature-based adjustable non-zero starting valve control signal to improve the response of the control system in the event of a substantial change in temperature since a last adjustment of the adjustable non-zero starting valve control signal.

9. The mass flow controller of claim 6, wherein the actual valve control signal level at the particular flow rate is obtained during a process run before the set point signal decreases.

10. The mass flow controller of claim 6, wherein the adjustable non zero starting valve control signal is selected from the group consisting of a voltage signal, current signal, charge signal, pulse-width-modulated voltage signal, and pulse-width-modulated current signal.

\* \* \* \* \*